United States Patent [19]

Furst

[11] 3,809,218

[45] May 7, 1974

[54] PLIABLE TAPE RECORD AND REEL THEREFOR

[75] Inventor: Marcel Furst, Sunnyvale, Calif.

[73] Assignee: Newell Industries, Inc., Sunnyvale, Calif.

[22] Filed: Jan. 24, 1972

[21] Appl. No.: 220,168

[52] U.S. Cl. ................ 206/53, 206/59 E, 242/71.1, 242/195, 242/197, 352/235

[51] Int. Cl. ......... B65d 85, G03b 1/04, G03b 1/56, G11b 23/10

[58] Field of Search..... 206/59 E, 59 F, 59 C, 59 R, 206/58, 53, 52 F, 52 R; 242/197, 192, 74, 54.1; 352/235; 24/16 PB

[56] References Cited

UNITED STATES PATENTS

| | | | |
|---|---|---|---|
| 2,614,761 | 10/1952 | Camras | 242/54.1 |
| 3,478,784 | 11/1969 | Woelfer et al. | 220/3 |
| 3,468,493 | 9/1969 | Ives | 242/74 |
| 1,973,457 | 9/1934 | Wittel | 206/59 E |
| 3,078,759 | 2/1963 | Brunswick | 352/235 |
| 3,620,893 | 11/1971 | Tarrson | 352/235 |
| 3,006,650 | 10/1961 | Ellmore | 242/197 |
| 3,677,495 | 7/1972 | Villers et al. | 206/53 |
| 3,539,132 | 11/1970 | Smitzer | 242/71.1 |

*Primary Examiner*—William T. Dixson, Jr.
*Attorney, Agent, or Firm*—Flehr, Hohbach, Test, Albritton & Herbert

[57] ABSTRACT

A tape record adapted to be coiled to form a roll thereof between the flanges of a support reel wherein the tape record comprises an information portion and terminal end portions. The tape record is characterized by means imparting resilient lateral compliance to at least one of the end portions to permit resilient reduction in the width occupied by the end portion when pressed between the flanges of a support reel thereby retaining the laterally reduced end portion between the flanges. More generally, a reel of pliable tape is provided comprising a cylindrical hub having flanges carried by the ends of the hub. A pliable tape record is wrapped about the hub between the flanges. The record has an information portion and a terminal end portion. The reel is characterized by resilient means yieldingly retaining engagement between the side edges of the end portion and the flanges.

3 Claims, 11 Drawing Figures

PLIABLE TAPE RECORD AND REEL THEREFOR

BACKGROUND OF THE INVENTION

This invention pertains to rolls and reels of record tape and other elongated record media of a pliable material adapted to be coiled into a roll as used, for example, in magnetic tape transport apparatus, optical film systems, and the like. The roll is particularly useful, for example, in tape transport apparatus of a type as disclosed in U.S. Pat. No. 3,370,803.

As disclosed in the above patent, a roll of tape is shown provided with a leader portion prepared with means extending longitudinally of the leader for gripping and holding the leader to the penultimate outermost convolution of the roll. A roll of tape prepared in the manner taught in the above identified patent is substantially self-sealed against exposure to dust, dirt, and the like, by virtue of the somewhat rigid tightly wrapped construction of the roll as packed.

As disclosed in the above identified patent, the leader is secured to the tape of the roll.

However, in certain circumstances, it may be desirable to employ a reel wherein flanges are carried by the ends of a cylindrical hub and the roll is coiled about the hub between the flanges.

SUMMARY OF THE INVENTION AND OBJECTS

According to the invention herein, a pliable tape record comprises a cylindrical hub, flanges carried by the ends of the hub, a pliable tape record adapted to be wrapped about the hub between the flanges, the record having an information portion and at least one terminal end portion, and resilient means yieldingly retaining engagement between the side edges of the end portion and the flanges. According to a preferred embodiment, a pliable tape record has been provided of a type adapted to be coiled to form a roll thereof between the flanges of a support reel wherein the tape record comprises an information portion and a terminal end portion, and the tape record is characterized by means imparting resilient lateral compliance to the end portion so as to permit resilient reduction in the width occupied by the end portion when pressed between the flanges of a support reel while disposed in pressing relation against the flanges thereby to retain the end portion between the flanges.

It is generally preferred in each of the foregoing circumstances, particularly when using relatively thick tape material, to provide the terminal end portion with a step disposed rearwardly from the endmost edge and at a distance therefrom corresponding to the circumference of the hub about when the end portion is to be wrapped. At that point, the step is formed to have a height corresponding to the thickness of the endmost edge so as to seat the edge thereunder and in this manner eliminate the typical "end-of-roll bump" or bulge as the roll of tape is wound upon a hub.

Accordingly, in general, it is an object of the present invention to provide an improved pliable tape record and improved reel of pliable tape.

It is a further object of the invention to provide a tape end portion or leader suitable for being automatically threaded through a tape transport and to be self-adhering to the take-up hub so that the leading end of the tape can be rolled onto the take-up hub.

It is another object of the invention to provide a tape end portion which is self-sealing about a roll of tape on a reel when the end portion is re-rolled around the tape roll.

It is also an object of the invention to provide a reel of tape wherein the usual end-of-roll bump can be eliminated.

It is a further object of the invention to provide a reel of tape with improved means for securing the innermost and outermost convolutions of the tape roll to the reel.

The foregoing and other objects of the invention will be more clearly evident from the following description of preferred embodiments when considered in conjunction with the drawings.

DESCRIPTION OF THE PREFERRED EMBODIMENTS

Figures 1, 2, 3, 4, 5, 6, 7, 7A, 8, 9, 10:
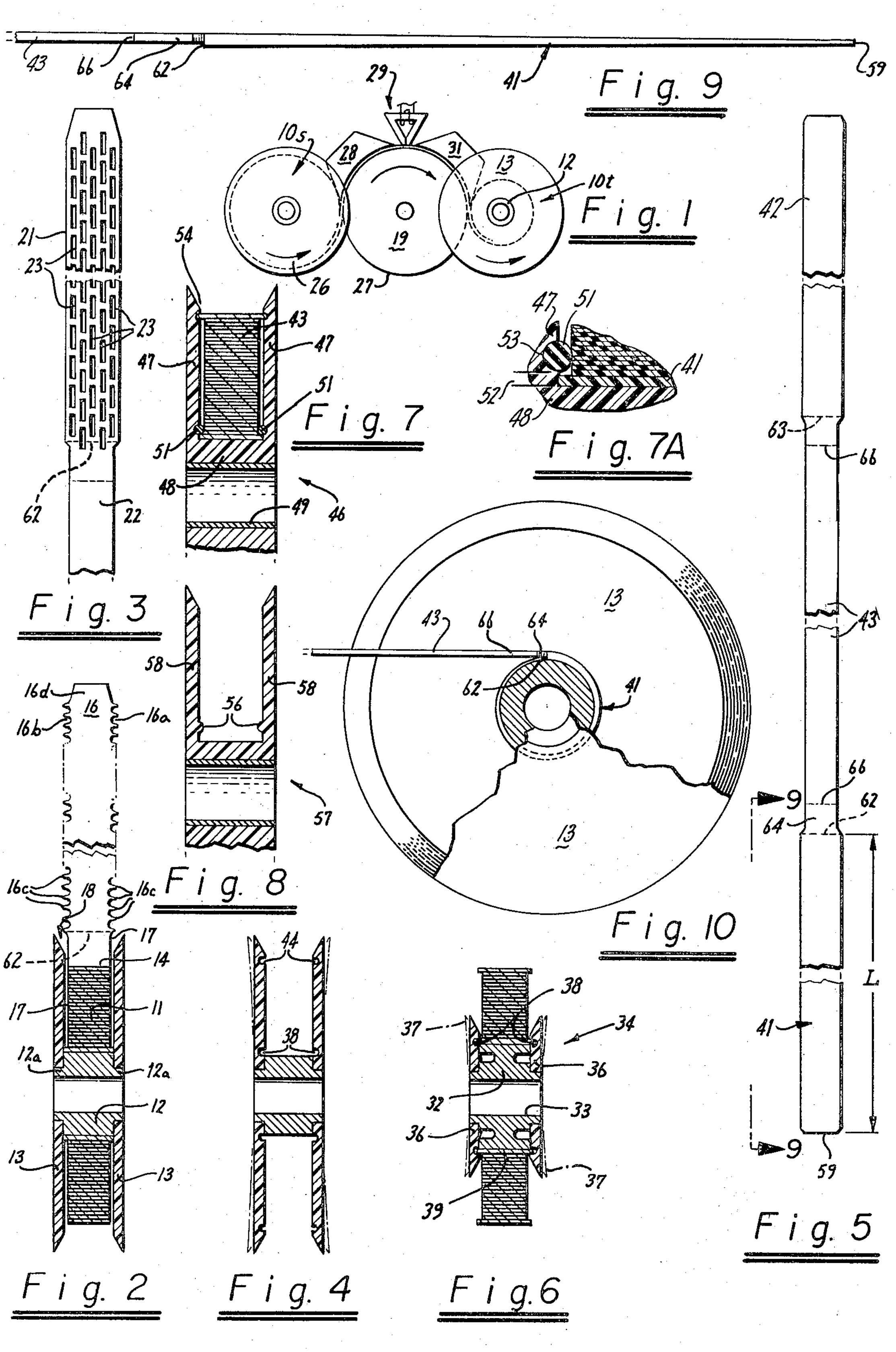
FIG. 1 is a diagrammatic illustration of a tape transport apparatus showing utilization of the tape record shown in FIGS. 2, 3 and 5 herein when used in apparatus of the type disclosed in the above identified patent (though slightly modified to accommodate the entry of its drive capstan between flanges of a reel of tape as disclosed according to the invention)
FIG. 2 is a centerline section view of a reel of pliable tape according to the invention.
FIG. 3 is a detail view of an end portion of another embodiment of a pliable tape record adapted to be wound upon the reel shown in FIGS. 2, 4, 6, 7 or 8.
FIG. 4 is a centerline section view of a tape reel construction according to the invention.
FIG. 5 is a diagrammatic plan view of a length of pliable record tape according to the invention in enlarged detail.
FIG. 6 is a centerline section view of a roll of tape wrapped about a hub according to the invention.
FIGS. 7 and 8 are centerline section views of additional embodiments according to the invention showing reels of tape.
FIG. 7A is an enlarged detail view of a portion of FIG. 7.
FIG. 9 is a side elevation view of FIG. 5 taken along the line 9—9 thereof.
FIG. 10 is a side view partly broken away diagrammatically illustrating the wrapping of a tape, of a type formed according to FIG. 9, about a hub.

As shown in FIG. 2, a reel 10 of pliable tape 11 comprises a cylindrical hub 12 formed with annular protruding bosses or rims **12*a* at each end. A pliable tape record 11 is wrapped about hub 12 between a pair of flanges 13 mounted upon bosses 12*a*. The tape record includes an information portion 14 and a terminal end portion 16 which, as shown in FIG. 2**, constitute a leader but which can also constitute the initial convolution wrapped about a take-up hub as well. Hence, both ends of the tape record can be formed, as desired, either in the same or different ways.

Resilient means have been provided yieldingly retaining engagement between the side edges **16*a*, 16*b* of end portion 16 and the confronting faces of flanges 13. Thus, the leader or terminal end portion 16 is formed with a number of resilient fingers 16*c* carried by the edges 16*a*, 16*b* of end portion 16. Fingers 16*c* are disposed to project laterally from leader 16 and are adapted to be yieldingly bent upon engagement of fingers 16***c* with flanges 13.

Accordingly, the tape record shown in FIG. 2 is characterized, in general, by means imparting resilient lateral compliance to the end porton 16 to permit resilient reduction in the width occupied by end portion 16 when pressed between the flanges of a support reel while disposed in pressing relation against flanges 13 thereby to retain end portion 16 between the two flanges 13.

In addition, the edges 17 of the information portion 14 of tape 11 are dimensioned to provide a clearance 18 with respect to flanges 13 whereby a flangeless rotating capstan 19 (FIG. 1) can enter between flanges 13 while riding in contact with the surface of the tape roll.

According to another embodiment also characterized by means imparting resilient lateral compliance to the end portion of a length of tape, there is shown in FIG. 3 the terminal end portion 21 of a length of tape of the type shown in FIG. 2 and having a record or information portion 22 secured thereto.

As shown in FIG. 3, perforations 23 are formed and distributed along the end portion 21 in a pattern to provide a laterally compressible lattice along the length of end portion 21.

Each of the pliable tape records shown in FIGS. 2 and 3 preferably includes a step 62 of a type shown in FIG. 9 for purposes as described further below in eliminating the end-of-roll bump or bulge.

Referring to FIG. 1, a diagrammatic representation of a tape transport apparatus of a type, for example, as shown in the above identified U.S. patent, is presented for ease of explanation of the utility of the foregoing and hereinafter described reels of tape.

In general, a supply reel 10*s* is mounted for rotation to operate in the direction of arrow 26 while driven by a drive capstan 19 formed with a resilient peripheral surface 27. The tip end 16*d* (FIG. 2) of tape extends slightly naturally away from the periphery of the surface of the tape as rolled upon reel 10*s* so as to be caught and peeled therefrom by suitable means represented simply by the peeling element 28 and described more particularly in the above identified patent. As supply roll 10*s* continues to rotate, the tape leader will be passed under a yieldingly loaded transducer assembly 29 to proceed onwardly beneath a guide element 31 which is effective as a peeling element only on reverse feeding of the tape.

While not shown in FIG. 1, it is to be understood that reels 10*s* and 10*t* are yieldingly urged toward capstan 19 whereby the surface of capstan 19 will serve to rotate both supply and take-up reels 10*s*, 10*t*.

Thus, it will be readily evident that upon initially feeding the leader of a tape, such as shown in FIG. 2, onto hub 12 of reel 10*t*, fingers 16*c* will be bent backwardly so as to reduce the width occupied by the end portion 16 between flanges 13. However, the outward resilience of fingers 16*c* will serve to retain leader 16 wrapped about hub 12.

It will be readily evident that by providing both ends of a length of tape with a similar end portion, such as 16, the outermost end portion 16 will similarly engage the confronting surfaces of side flanges 13 at a radially remote position whereby the reel can be removed from the tape transport with the outermost convolution secured to protect or "seal" the tape roll. The confronting flange surfaces can aid in gripping the fingers 16*c* when scored or formed with shallow concentric grooves (not shown).

According to another embodiment, the flanges are resilient and disposed to flex away from the ends of the supporting hub so as to enlarge the spacing therebetween thereby accommodating the use of a simply widened end portion of the length of tape as well as the two previously described tapes. In addition, each of the confronting faces of the flexible flanges is formed with an annular slot or groove therein at a radius substantially corresponding to the radius of the peripheral surface of the hub for engaging the side edges of the end portion.

Thus, as shown in FIG. 6, an annular hub 32 is formed with a hollow central opening 33 adapted to receive a mounting spindle therein for supporting the roll 34 for rotation.

Resilient plastic flanges 36 are disposed about the annular boss-type ends of hub 32 by suitable means, such as glue or the like, whereby the flanges are free to flex away from their natural plane (as indicated by movement to the positions shown in phantom lines 37).

The confronting faces of flanges 36 are each formed with an annular slot 38 at a radius lying substantially at the periphery 39 of hub 32.

A length of tape of the type shown in FIG. 5 formed with widened end portions 41, 42 as compared to an intermediate information or record portion 43 can be wrapped about hub 32 (FIG. 6) and it will be readily evident that the initial convolution formed by end portion 41, for example, will be pressed by capstan 19 against hub 32 and, by virtue of the increased width of portion 14 as compared to the opening between flanges 36, will act upon the bevelled edges 40 to cause flanges 36 to be urged outwardly against the resilience thereof to permit portion 41 to pass and ultimately be lodged into slot 38. The width of portion 41 is slightly greater than the width of the periphery of hub 32 whereby the compression of the resilient flanges 36 serves to engage the side edges of portion 41.

From the foregoing, it will be readily evident, however, that if a tape of the type shown in FIG. 5 should be utilized in conjunction with a reel 34 having limited radius to its flanges, suitable attaching means will have to be provided on the end portion 42 to hold the outermost convolution to the roll, and this, of course, can be provided as shown in the above identified patent or otherwise. Also, it is contemplated that hub 32 can be utilized as a take-up hub in apparatus where the tape is fed onto the hub in one direction and then rewound off the hub back onto the supply spool.

Where it is desired to utilize tape of a type shown in FIG. 5 in conjunction with the arrangement shown in FIG. 6, by expanding the radius of the flanges 36 (FIG. 4), it is readily evident that a second annular slot 44 can be formed radially outwardly of slot 38′ so as to be in position to engage the edges of the outer terminal end portion 42.

According to another embodiment, an annular ridge is formed on the confronting surfaces of the flanges at a radius slightly greater than the radius of the hub so as to form an annular slot or groove disposed substantially at the radius of the periphery of the hub.

As shown in FIG. 7, a tape reel 46 appears as including flanges 47 formed integrally with the annular hub portion 48 all of suitable semi-rigid material, such as plastic. A metallic cylindrical bushing 49 is disposed centrally of the reel to support the reel for rotation. It will be readily evident, of course, that with suitable plastics, bushing 49 can be eliminated. O-rings 51 are secured in their respective confronting surfaces of flanges 47 by disposition into an annular groove formed in the confronting surface of the flange. These O-rings may be retained therein by means of glue or otherwise suitably secured within their annular groove-like seat 53. Preferably, O-rings 51 are of rubber or other suitable resilient material, and they are disposed at a radius slightly greater than the radius of the circumference of hub 48 so as to form an annular slot 52 at the radius of the periphery of hub 48 whereby the end portion 41 can be pressed past O-rings 51 and retained at their edges between O-rings 51 and hub 48.

From the foregoing, it will be readily evident that the embodiment shown in FIG. 7 provides a suitable clearance 54 between the side edges of the roll of tape 43 while readily engaging end portion 41 when rolled or pressed by capstan 19 beyond O-ring 51.

As shown in FIG. 8, there is provided a further embodiment showing a reel 57 wherein the confronting faces of flanges 58 are formed with a protruding annular ridge 56 spaced as in FIG. 7 with respect to the hub. In the embodiment shown in FIG. 8, the ridge 56 is also somewhat resilient based upon the choice of plastic material utilized for forming reel 57 whereby end portion 41 can be rolled or pressed behind ridges 56.

From the foregoing, it will be readily evident that the various tape record structures, such as shown in FIGS. 2, 3 and 5, can be utilized in the various reels as described above. For example, while describing the reel of FIGS. 7 and 8 with respect to the tape shown in FIG. 5, it will also be readily evident that the tapes shown in FIGS. 2 and 3 can equally be used to advantage in the reels of FIGS. 4, 6, 7 and 8.

When wrapping a pliable record tape of the kind described above and otherwise known in the art, it will be readily apparent that the endmost edge 59 as initially wrapped about the hub will cause a bump in the next subsequent convolution of tape and depending upon the thickness of the tape and other factors can generate a bump in many subsequent convolutions of the roll of tape wrapped upon the reel. As described herein, such a bump has been and will hereafter be referred to as the "end-of-roll bump" or bulge caused by the leading edge 59 of the tape underlying subsequent convolutions.

It is known to those skilled in the art that the existence of such a bump in the surface of a roll of tape wrapped about the take-up reel **10*t* can cause objectionable perturbations in the movement of the tape relative to transducer assembly 29** and, hence, cause transducing problems.

Accordingly, means as shown best in FIGS. 9 and 10 have been provided for eliminating the "end-of-roll bump" for each of the terminal end portions shown in FIGS. 2–8.

Accordingly, where the tape hub 61 has a predetermined circumference, the terminal end portion 41 adapted to be wrapped about the circumference of hub 61 should have a length defined by the dimension L corresponding to the circumference of hub 61.

Further, when using relatively thick materials, the thickness of end portion 41 is tapered to gradually increase from the endmost edge 59 rearwardly for a distance corresponding to the length L, i.e., the circumference of hub 61, and at that point a step 62 (FIG. 9) is formed having a height (as shown in FIGS. 9 or 10) corresponding to the thickness of edge 59. In this manner, step 62 serves to seat edge 59 thereunder so as to eliminate end-of-roll bump or bulge as the roll of tape is wound upon the hub.

The trailing part 64 of end portions 41, 42 can be sonically welded or otherwise suitably attached to the information portion 43 of the tape. Such connection is shown at 66.

Similarly, the opposite end portion 42 shown in FIG. 5 includes a similar step 63 whereby the tape can be handled in a bi-directional manner while eliminating end-of-roll bump in each direction of operation.

From the foregoing, it will be readily evident that there have been shown and described various embodiments of a tape record and reel of tape having improved means for retaining the outermost convolution of tape wrapped about the reel in protective relationship to the remaining tape of the roll. Also, the terminal end portion of the tapes has been prepared in a manner in conjunction with the tape reels as shown above whereby the tape is readily attached to the take-up hub of a transport having a capstan arranged to rollingly press the tape leader against the hub of a take-up reel.

I claim:

1. A pliable tape record adapted to be coiled to form a roll thereof about the hub of and between the flanges of a support reel, said tape record comprising an information portion and a terminal end portion, said terminal end portion corresponding in length substantially to the circumference of said hub, said tape record being characterized by means imparting resilient lateral compliance in the plane of and substantially throughout the length of said end portion to permit resilient reduction in the width occupied by said end portion throughout said length when pressed between the flanges of a support reel and disposed in pressing relationship against said flanges thereby to retain said end portion between said flanges, wherein said end portion comprises a lattice of perforations each formed of sufficient length and width and disposed in longitudinally offset rows with respect to each other and distributed along said end portion to render said lattice laterally compressible along said end portion, the side edges of said end portion being uniformly more widely spaced substantially throughout the length of said end portion than the spacing between the edges of said information portion so as to substantially, uniformly apply compression throughout a corresponding length of said end portion.

2. A pliable tape record adapted to be coiled to form a roll thereof about the hub of and between the flanges of a support reel, said tape record comprising an information portion and a terminal end portion, said tape record being characterized by means imparting resilient lateral compliance in the plane of and substantially throughout the length of said end portion to permit resilient reduction in the width occupied by said end portion throughout said length when pressed between the flanges of a support reel and disposed in pressing relation against said flanges thereby to retain said end portion between said flanges, said end portion including a lattice of perforations each formed of sufficient length and width and disposed in longitudinally offset rows with respect to each other and distributed along said end portion to render said lattice laterally compressible along said end portion, the side edges of said end portion being uniformly more widely spaced substantially throughout the length of said end portion than the spacing between the edges of said information portion so as to substantially, uniformly apply compression throughout a corresponding length of said end portion.

3. A pliable tape record adapted to be coiled to form a roll thereof about a cylindrical hub of predetermined circumference, said tape record including an information portion of uniform thickness and an elongate pliable terminal end portion fixed in end-to-end relation to said information portion and adapted to be wrapped about the circumference of said hub, the thickness of said end portion being tapered to gradually increase in a direction starting from the endmost edge and leading rearwardly, said end portion being of a thickness adjacent said information portion greater than the thickness of said information portion defining an abrupt step having a height corresponding substantially to the thickness of said endmost edge, said step being displaced from said endmost edge a distance corresponding substantially to said circumference of said cylindrical hub to provide for coiling said information portion thereover without abrupt changes in radius so as to eliminate end-of-roll bump or bulge as the roll of tape is wound upon the hub.

* * * * *